US008650622B2

(12) United States Patent
Murakami et al.

(10) Patent No.: US 8,650,622 B2
(45) Date of Patent: Feb. 11, 2014

(54) METHODS AND ARRANGEMENTS FOR AUTHORIZING AND AUTHENTICATION INTERWORKING

(75) Inventors: Shingo Murakami, Kanagawa (JP); Kristoffer Gronowski, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 192 days.

(21) Appl. No.: 13/174,916

(22) Filed: Jul. 1, 2011

(65) Prior Publication Data

US 2013/0007846 A1    Jan. 3, 2013

(51) Int. Cl.
G06F 7/04    (2006.01)

(52) U.S. Cl.
USPC .......... 726/4; 726/3; 726/5; 726/25; 713/171; 713/186; 713/182; 705/26

(58) Field of Classification Search
USPC ................ 726/4, 6, 3, 22; 713/183, 193, 182
See application file for complete search history.

(56) References Cited

U.S. PATENT DOCUMENTS

| 7,502,931 | B2 * | 3/2009 | Theimer | 713/171 |
|---|---|---|---|---|
| 8,205,240 | B2 * | 6/2012 | Ansari et al. | 726/1 |
| 8,285,992 | B2 * | 10/2012 | Mathur et al. | 713/171 |
| 8,397,294 | B2 * | 3/2013 | Vanstone et al. | 726/22 |
| 2004/0128499 | A1 | 7/2004 | Peterka et al. | |
| 2006/0190991 | A1 | 8/2006 | Iyer | |
| 2006/0236116 | A1 * | 10/2006 | Patel | 713/183 |
| 2008/0066181 | A1 * | 3/2008 | Haveson et al. | 726/26 |
| 2009/0054036 | A1 | 2/2009 | Chen et al. | |
| 2009/0217033 | A1 | 8/2009 | Costa et al. | |
| 2010/0138900 | A1 * | 6/2010 | Peterka et al. | 726/4 |
| 2010/0199341 | A1 * | 8/2010 | Foti et al. | 726/9 |
| 2010/0205658 | A1 * | 8/2010 | Griffin | 726/5 |
| 2011/0030047 | A1 | 2/2011 | Gao et al. | |
| 2012/0084834 | A1 * | 4/2012 | Brown et al. | 726/3 |
| 2012/0151210 | A1 * | 6/2012 | Perez | 713/168 |

FOREIGN PATENT DOCUMENTS

| EP | 2418883 A1 | 2/2012 |
|---|---|---|
| WO | 2006106393 A2 | 10/2006 |
| WO | 2009137625 A2 | 11/2009 |
| WO | 2012069263 A2 | 5/2012 |

OTHER PUBLICATIONS

Batyuk L, Multi Device Key Management in Computing Devices, Oct. 2011, BWCCA Broadband and Wireless computing, vol. 1, pp. 207-214.*
Kbar, G., "Wireless Network Token-Based Fast Authentication," 17th International Conference on Telecommunications, Apr. 4, 2010, Piscataway, NJ, US.

* cited by examiner

*Primary Examiner* — Nathan Flynn
*Assistant Examiner* — Viral Lakhia
(74) *Attorney, Agent, or Firm* — Coats & Bennett, PLLC

(57) ABSTRACT

This disclosure relates to a portable communication device and a network-side authorization server, and to methods therein. By splitting the functionality of an OAuth authorization server and moving the authorization endpoint into, for instance a mobile phone, an authorization server within the mobile phone is provided. This mobile phone authorization server does not need to communicate with the network-side for getting an authorization code or an access token.

20 Claims, 10 Drawing Sheets

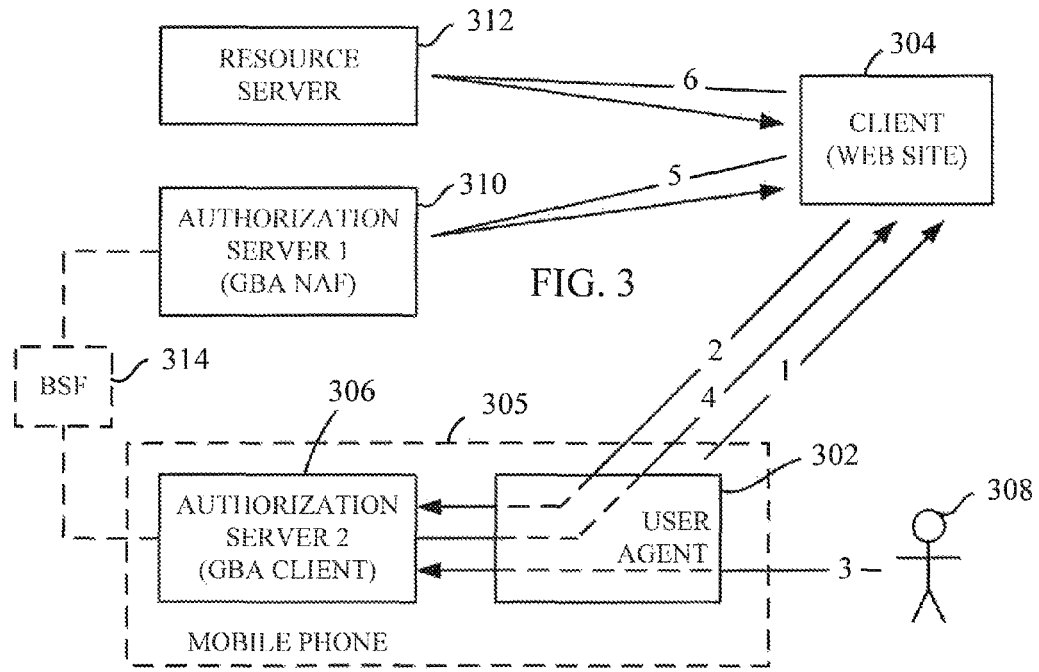
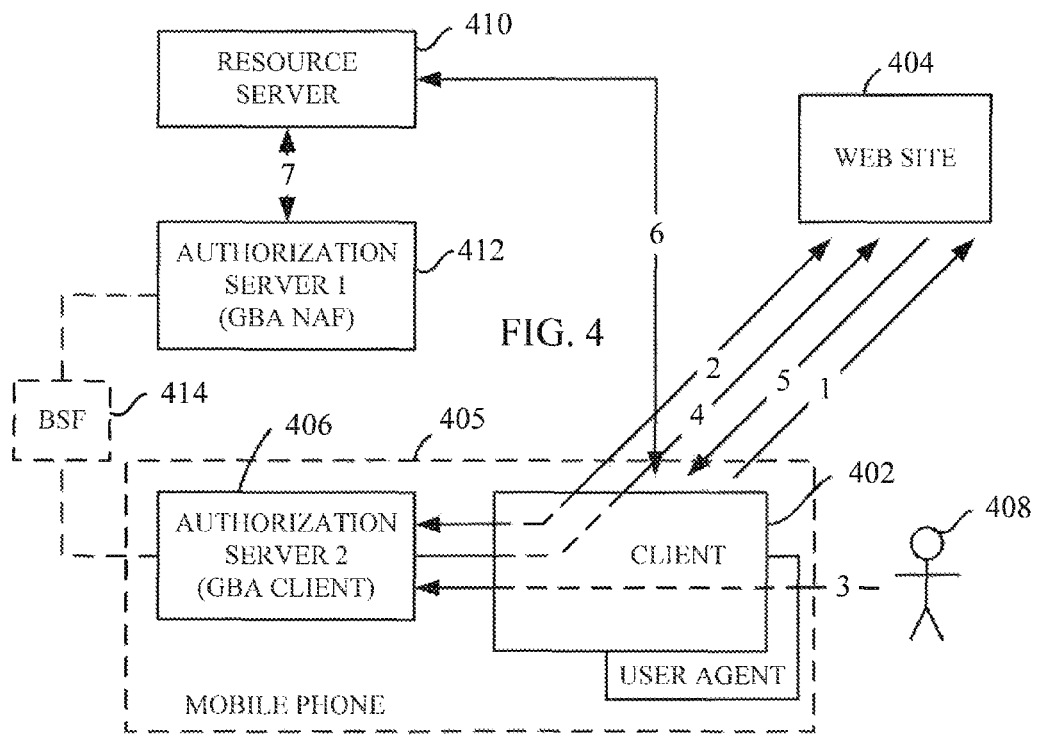

METHODS AND ARRANGEMENTS FOR AUTHORIZING AND AUTHENTICATION INTERWORKING

TECHNICAL FIELD

This disclosure pertains in general to the field of authorization, and more particularly to methods and arrangements for authorization and authentication interworking.

BACKGROUND

In a traditional client-server authentication procedure, the client accesses a protected resource on the server by authenticating with the server using credentials of the resource owner. In order to provide third party applications with access to protected resource, the resource owner shares its credentials with the third party.

There are several drawbacks with such an authentication procedure. Third party applications have to store the credentials for future use. Servers are required to support password authentication. Third-party applications gain a broad access to the owner's protected resources. In addition, resource owner cannot revoke access to an individual third-party without revoking access to all third-parties.

The standardized OAuth (Open Authorization) Protocol introduces an authorization layer and separates the role of the client from the resource owner. In OAuth the client requests access to resources that are controlled by the resource owner and hosted by a resource server, and is issued a different set of credentials than those of the resource owner. Instead of using the credentials of the resource owner, the client obtains an access token that is a string that denotes a specific scope, duration etcetera. Access tokens are issued to third-party clients by an authorization server with the approval of the resource owner. The client may then use the access token to access the protected resource that is hosted by the resource server.

For instance, a web user who is the owner of a resource can grant a copying service, acting as a client, access to the web user's protected photos that are stored in a photo sharing service, which service acts as a resource server. This is done without sharing the web user's username and password with the copying service. Instead, the web user authenticates herself directly with a server that is trusted by the photo sharing server, acting as an authorization server, which issues specific credentials to the copying service.

The OAuth 2.0 Authorization Protocol (draft revision 13) has almost become a de-facto standard for an authorization delegation protocol for Internet services. OAuth has the two different main flows, of which one is the authorization code flow and the other is the implicit grant flow.

In order to provide authentication of a user of a portable communication device, Generic Bootstrapping Architecture (GBA) may be combined with OAuth. User authentication is possible if the user owns a valid identity on a Home Location Register (HLR) or a Home Subscriber Server (HSS). GBA is standardized at $3^{rd}$ Generation Partnership Project. Authentication of the user is enabled by sharing a secret, with one copy in the portable communication device and one copy in the HLR/HSS.

By challenging the portable communication device from the network and by verifying that the answer is same or similar to the one predicted by the HLR/HSS, the GBA authenticates the user.

The GBA establishes a shared secret between the portable communication device and a GBA Network Application Function (NAF). First, the portable communication device bootstraps a master shared secret with the Bootstrapping Server Function (BSF). After bootstrapping the master secret, the portable communication device may generate a shared secret based on the master shared secret for the GBA NAF. The service provider may retrieve the same shared key with the portable communication device from the BSF. This shared secret is limited in time and is valid for a specific domain only.

The Generic Bootstrapping Architecture (GBA) thus enables establishment of a KsNAF key between the GBA client and the GBA NAF. Thereafter the GBA NAF may retrieve the KsNAF key from the BSF, which may be used in protocols between the client and services.

An overview of a straightforward prior-art combination of OAuth and GBA for the authorization code flow and of the implicit grant flow according to the prior art is illustrated in FIG. 1 and FIG. 2, respectively.

A brief of each flow is given below.

FIG. 1 presents a co-located user agent and GBA client 102, an OAuth client being a web site 104, an authorization server 106, an authorization endpoint 108, a token endpoint 110 and a resource server 112.

The user of the user agent 102 connects (1) to the web site 104 and requests access to resources on a resource server 112. The user is then redirected (2) to an authorization endpoint 108 of the authorization server 106. The user then authorizes (3) the request for access to resources on the resource server 112. The user also authenticates (3) the request via GBA. Based on user authorization the authorization server 110 creates an authorization code and sends (4) it to the web site 104. The web site requests (5) an access token by presenting the authorization code, and received an access token. The access token may then be used to access the resource on the resource server 112 by sending (6) the access token to said resource server 112.

FIG. 2 presents a scenario for which the user agent is co-located with the OAuth client. The user of a user agent 202 requests (1) resources from a resource server 210. The web site redirects (2) the user to an authorization endpoint 206 of an authorization server 208. The user then authorizes and authenticates (3), after which the authorization server issues an access token and provides (4) a access token carried by a Uniform Resource Location (URL) fragment to the user agent 202. The web site then sends (5) a script by which the access token can be obtained from the URL fragment. The resources may then be accessed by providing the token to the resource server 210.

OAuth interworking with GBA implicates that GBA NAF is co-located on the authorization server. The user is authenticated to the Network Application Function (NAF) on the authorization server through a GBA Ua interface.

Attention is now drawn to the authorization endpoint and the token endpoint of which both are provided by the OAuth authorization server for authorization code flow, and of which the token endpoint is provided by an OAuth authorization server for implicit grant flow.

In short the authorization endpoint is used to obtain authorization from the resource owner via user-agent redirection. As a result of successful authorization, the authorization endpoint returns an authorization code to the client in the case of the authorization code flow or an access token to the client in the case of the implicit grant flow.

The token endpoint however is used to issue an access token in exchange of an authorization code after successful authentication of the client with a registered client identity and a client secret.

As illustrated in FIGS. 1 and 2, the user agent typically comprised in a portable communication device requires a number of interactions with network components. This is time consuming and consumes battery power, which always is an article in short supply. There is hence a need for an improvement of the authentication interworking with an authorization service.

SUMMARY

An object of the present disclosure is to address at least some of the issues outlined above, and provide an efficient over-the-air communication within OAuth interworking Generic Bootstrapping Architecture (GBA)

This is attained by splitting an authorization server into an authorization endpoint and a token endpoint, and moving the authorization endpoint to a portable communication device.

According to one aspect of this disclosure, a method in a portable communication device for authorizing a client to access a resource in a network, is disclosed. The portable communication device is associated with an authorization server for the network via an authentication function that has shared an authentication key with the portable communication device. The method comprises generating an at least provisional access token to be used by said client for accessing said resource in the network, based on said shared authentication key. The method also comprises providing said at least provisional access token for the client enabling authentication of said at least provisional access token by the authorization server for the network.

The method in a portable communication device may further comprise providing a request for authorization of a client to access the resource, to a user of the portable communication device and receiving an authorization from the user to authorize the client to access the resource. The generating of an at least provisional access token is herein also performed based on receipt of said authorization from the user to authorize the client to access the resource.

The method in a portable communication device may further comprises receiving a redirection Uniform Resource Location (URL) prior to the providing a request for authorization to a user.

The at least provisional access token within the method in a portable communication device may comprise an authorization code.

The at least provisional access token within the method in a portable communication device may comprise an access token.

The method in a portable communication device may comprise receiving by short-range wireless communication an authorization by a user to authorize the client to access the resource, from another portable communication device.

The method in a portable communication device may further comprise sending the at least provisional access token by short-range wireless communication to said another portable communication device.

The short-range wireless communication within the method in a portable communication device may comprise Near Field Communication.

According to another aspect of this disclosure a portable communication device for authorizing a client to access a resource in a network, is disclosed. The portable communication device is associable with an authorization server for the network via an authentication function that has shared an authentication key with the portable communication device. The portable communication device comprises an authentication processor that is configured to generate an at least provisional access token to be used by said client for accessing said resource in the network, based on said authentication key. The authentication processor is also configured to provide said at least provisional access token for the client, enabling authentication of said at least provisional access token by the authorization server.

The authentication processor of the portable communication device may further be configured to provide a request for authorization of the client to access the resource, to a user of the portable communication device, and to receive an authorization of the client to access the resource from the user of the portable communication device.

The portable communication device for authorizing a client may further comprise a short-range wireless communication application that is configured to receive an authorization from a user of another portable communication device, and to send said at least provisional access token by short-range wireless communication NFC (Near Field Communication) to said another portable communication device.

The authentication processor of the portable communication device may further comprise a Generic Bootstrapping Architecture, GBA, client that is configured to establish a GBA Bootstrap with the authentication function comprising a GBA Bootstrapping Server Function.

The portable communication device for authorizing a client may be a mobile phone.

According to yet another aspect of this disclosure a method in an authorization server for authenticating access to a resource in a network for a client, is disclosed. The authorization server has shared a client identifier with said client and is associated with an authentication processor of a portable communication device via an authentication function. The method comprises receiving a request related to an at least provisional access token, retrieving an authentication key based on interaction with the authentication function, and verifying of the at least provisional access token, by which the access to the resource is authenticated.

The verifying of the at least provisional access token in the method in an authorization server, comprises determining an authentication signature based on the retrieved authentication key, and verifying that said determined authentication signature and an authentication signature as comprised in the at least provisional access token from the authentication processor, are equal.

The at least provisional access token in the method in an authorization server may comprise an authorization code, and the method further comprises issuing an access token based on the verifying of the at least provisional access token.

The at least provisional access token in the method in an authorization server may comprise an access token, and wherein the receiving a request related to an at least provisional access token, comprises receiving a request to verify the access token.

According to still yet another aspect of this disclosure an authorization server for authenticating access to a resource in a network for a client, sis disclosed. The authorization server is configured to, prior to authenticating access to the resource, have shared a client identifier with said client and be associated with an authentication processor of a portable communication device via an authentication function. The authorization server comprises a processor that is configured to receive a request related to an at least provisional access token, and to retrieve an authentication key based on interaction with an authentication function in the network. The processor is also configured to verify the at least provisional access token, by which the access to said resource in the network is authenticated.

The processor of the authorization server may further be configured to determine an authentication signature based on the retrieved authentication key, and to verify that said determined authentication signature and an authentication signature as comprised in the at least provisional access token from the authentication processor, are equal.

The at least provisional access token in the authorization server may comprise an authorization code, where the processor further is configured to issue an access token based on the verifying of the at least provisional access token.

The at least provisional access token in the authorization server may comprise an access token, where the request related to an at least provisional access token comprises a request to verify the access token.

The processor in the authorization server may embed a Generic Bootstrapping Architecture network application function.

An advantage of the embodiments of the present disclosure is that they save over-the-air communication and several round trip communications between mobile devices and network-side OAuth authorization servers. This enables faster completion of the OAuth authorization as compared to methods known.

Another advantage is that the present disclosure also enables a split device scenario where the user is using a device such as TV and tablet that is different from the mobile phone for enjoying Internet services, when she/he wants to use her/his mobile phone as a key device for granting authorization by positioning or touching the mobile phone to the other device. The present disclosure fits very well into the user experience because mobile phone works just as the authorization server that does not need to communicate with network-side for getting an authorization code or an access token.

BRIEF DESCRIPTION OF DRAWINGS

These and other aspects, features and advantages of which this disclosure is capable of, will be apparent and elucidated from the following description of embodiments of this disclosure, reference being made to the accompanying drawings, in which FIGS. 1 and 2 schematically illustrate prior art architectures;

FIGS. 3 and 4 schematically illustrate architectures according to some embodiments of this disclosure;

DETAILED DESCRIPTION

Figure 1:
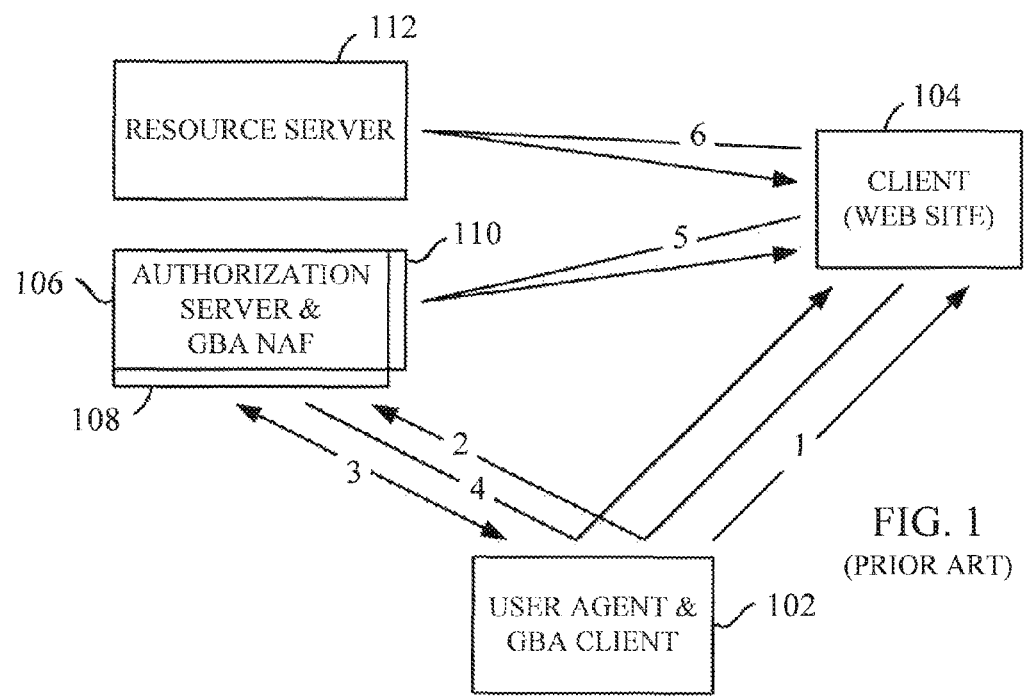

According to one or more embodiments herein, the authorization endpoint of an authorization server is moved from being located in the network according to known approaches to being located in a portable communication device, such as a mobile phone, having a GBA client function.

By providing the authorization endpoint in the portable communication device several roundtrip communications over-the-air between the portable communication device and the authorization server of the network can be eliminated. Completion of an OAuth authorization process may be accomplished more rapidly than with the prior art straight forward combination of OAuth and GBA.

FIG. 3 presents in general an architecture according to some embodiments of this disclosure, and in more particular an architecture for OAuth authorization code flow interworked with GBA.

FIG. 3 comprises a user agent 302, a client 304 in the form of a web site, a mobile phone 305, an authorization server 2 306, a user 308, an authorization server 1 310, a resource server 312, and a Bootstrapping Server Function (BSF) 314. The authorization server 2 306 of the mobile phone 305 comprises an authorization endpoint. The resource server 312, the authorization server 1 310 and the client (web site) 304 are located on a so called network-side, whereas the mobile phone 305 is located on a so called mobile-side and may communicate with the client on the network-side.

A brief description of the communication within the architecture will now be presented. The user agent 302 requests (1) the client 304 in the web site to access to his or her resources on the resource server 312.

The client 304 in the web site server may be any network-side web server application such as a Hypertext Preprocessor program, or a Java Servlet program running on the top of a web server such as Apache or any Java Platform Enterprise Edition server such as JBoss, or Glassfish.

The client 304 redirects (2) the user on the user agent to an authorization endpoint, i.e. to the Authorization server 2 306 within the mobile phone 305. The user agent invokes the user, and asks if the user authorizes the client to access the resource. If the user authorizes (3) the authorization server 2 creates an authorization code and provides (4) it to the client. The client may then request (5) an access token from the authorization server 1 310 by presenting the authorization code. The authorization server 1 310 grants an access token, with which the client 304 may access (6) the protected resource in the resource server 312.

The authorization server 2 306 is associated with the authorization server 1 310 via a BSF being one kind of authentication function.

FIG. 4 presents in general an architecture according to some embodiments of this disclosure, and in more particular an architecture for OAuth implicit grant flow interworked with GBA.

FIG. 4 comprises a user agent co-located with a client 402, a web site 404, a mobile phone 405, an authorization server 2 406 having a GBA client, a user 408, a resource server 410, an authorization server 1 412, and a BSF 414. The authorization server 2 406 of the mobile phone 405 comprises an authorization endpoint.

The resource server 410, the authorization server 1 412 and the web site 404 may be considered to be located on a network-side of the architecture.

A brief description of the communication within the present architecture will now be presented. The user on the user agent sends (1) a request to the web site 404. The user is redirected (2) by the web site 404 to the authorization endpoint, i.e. the authorization server 2 406. The user agent invokes the authorization server 2, which presents a dialog box asking if the user authorizes an application "FriendMusic" to access his or her resource for the specified scope "friends". The user 408 authorizes (3) the application to access the resource. The authorization server 2 generates an access token and redirects (4) the user agent to a redirected Uniform Resource Location. The web site returns a script web page by which the client is capable of accessing the fragment and extracting the access token from the fragment. The client then requests access to the resource by presenting (6) the access token. The resource server sends (7) a request for verification of the access token to the authorization server 1 412. The authorization server 1 retrieves a Network Application Function (NAF) key, based on interaction with BSF 414. The authorization server 1 verifies the access token based on the NAF key, after which the resource server receives a verification response, and if verified, allows (7) access to the resource.

The client 402 in the mobile phone 405 may be a web application, for instance JavaScript+HTML code, which is loaded from the web site 404 when a user 408 visits the web site by his or her mobile phone user agent.

Before presenting a more detailed architecture of the authorization code flow as well as the implicit grant flow, a few technical features describing the present disclosure will be described.

Figure 2:
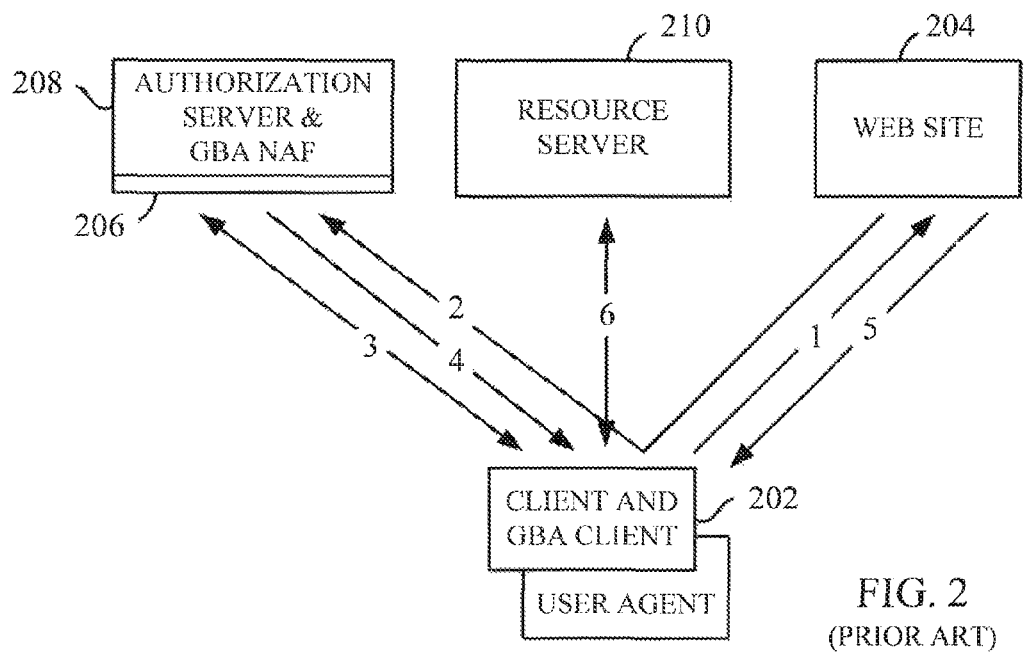

The functionality of the authorization server, from FIG. 1 or 2, is split into a token endpoint functionality, an authorization point functionality and a client registration functionality. The authorization endpoint functionality is moved to a portable communication device, such as a mobile phone, which is denoted authorization server 2, to distinguish it from the authorization server 1, comprising the token endpoint and client registration functionalities.

Although client registration is not explicitly specified in the OAuth Authorization Protocol, it is mentioned herein in order to clarify which functions remain in the network-side authorization server, i.e. authorization server 1.

The authorization server 1 implements GBA NAF, whereas the authorization server 2 implements GBA client.

The user agent is redirected to the authorization server 2 by an application client and by using a custom scheme URL.

An authorization code generated by the authorization server 2 in the case of authorization code flow, comprises at least client name, client id, scope, BTID and signature that is signed by a NAF key, wherein the client refers to the client application.

The authorization server 1 verifies the authorization code by a NAF key, and when verified sends an access token to the client.

Figure 5A:
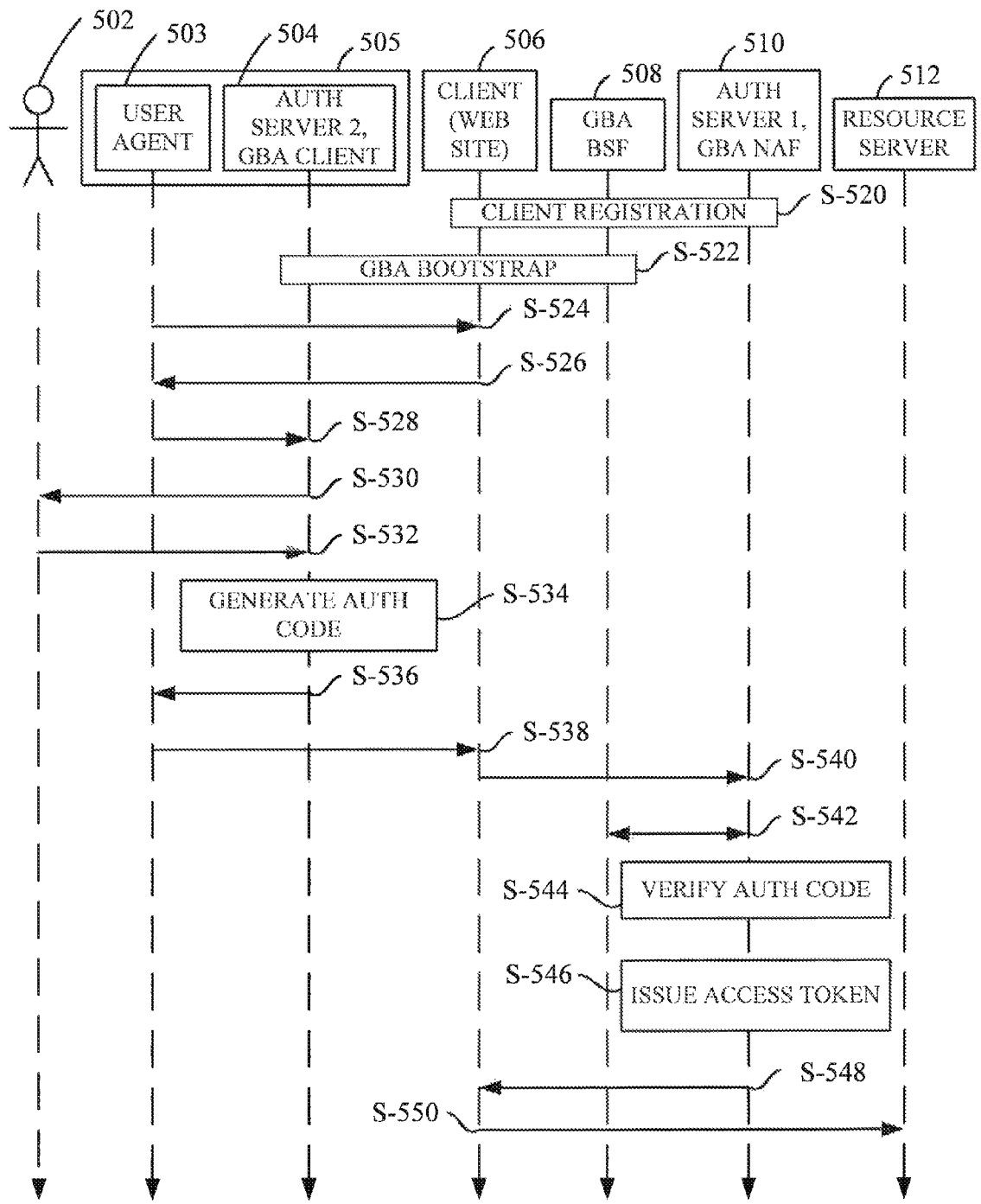
FIGS. 5A, 6A and 7 illustrate signaling type-diagrams related to embodiments of this disclosure.

A more detailed description of the authorization code flow according to some embodiments of the present disclosure will now follow. FIG. 5A illustrates a signaling-type diagram of an authorization code flow architecture, having a user 502, a user agent 503, an authorization server 2 504, a portable communication device 505, a client 506 on a web site, a GBA BSF 508, an authorization server 1 510 with a GBA NAF, and a resource server 512.

Prior to initiating the authorization code flow, the client 506 is registered in the authorization server 1 510. During the client registration S-520 a client owner registers its redirect URL to be used by OAuth and a client name e.g. "FriendMusic".

This is similar to the need to register the name of your Facebook application to Facebook if you want your application to access protected resources of Facebook users. The client owner may be informed of a client_id, a client_secret, and how to construct an authorization endpoint URL and a token endpoint URL.

It may be added that the service provider who runs the web site, the client of which is accessing to user resources decides if the authorization code flow or the implicit flow will be used. The web site registers in the authorization server 1 510 and gets a client_id. If authorization code flow is to be used the client_id is embedded in the web server application or server program of the web site.

Also, prior to starting the authorization code flow, a Generic Bootstrapping Architecture Bootstrap S-522 is performed between the GBA client 504 and the Bootstrapping Server Function (BSF) 508. During the bootstrap a Bootstrap Transaction Identifier (BTID) is generated. Moreover, during the bootstrap an authentication key is also shared between the GBA client 504 of the mobile phone 505 and the BSF 508. This authentication key is a master secret key. It is added that the NAF key may be derived from the master secret key.

The authorization code flow is suitable for clients that are capable to maintain their client credentials confidential for authenticating with the token endpoint of an authorization server. Examples of such clients are clients implemented on a secure server. The client must be able to interact with the resource owner's user agent, which typically is a web browser, and to receive incoming requests via redirection from an authorization endpoint of the authorization server.

The authorization code flow will now be described in somewhat more detail. Having established the client registration S-520 and the GBA Bootstrap S-522 the user 502 on the user agent 503 may requests S-524 the OAuth client 506 on the web site to access his or her resource on the resource server 512.

The client may obtain information that the user agent 503 supports the GBA client 505 with OAuth authorization server function proposed by the present disclosure. This may be accomplished via a Hyper Text Transfer Protocol (HTTP) header such as a user-agent or a proprietary HTTP extension header, for instance X-3GPP-GBA-OAuth. Alternatives may be used.

The user 502 of the user agent 503 is now redirected S-526 by the client 506 to the user authorization endpoint, i.e. to the authorization server 2 504, via the user agent 503. An example of a redirection URL to the authorization endpoint look may like:

gba://oauth?client_name=FriendMusic&response_type=code&client_id=09736251&scope=friends&redirect_uri=https://friendmusic.com/callback It is noted that this presented example of redirection URL uses a custom URL scheme to invoke the authorization server 2 504, working as a local GBA client application. Invoking a local application from a web browser by means of a custom URL is well established. The redirection URL may alternatively, use a normal HTTP scheme, for instance, http://localhost:8080/gba/oauth?client_name=FriendMusic&response_type=code&client_id=09736251&scope=friends&redirect_uri=https://friendmusic.com/callback It may be added that the authorization server 2 works as a local HTTP server that listens to 8080 of the local host.

In the redirection the user agent 503 invokes S-528 the authorization server 2 504 by using the redirection URL scheme. In S-530, the authorization server 2 for instance presents a dialog box, interrogating the user if the user authorizes a client with client name "FriendMusic" to access his or her resource for the specified scope "friends", as earlier defined.

Figure 5B:
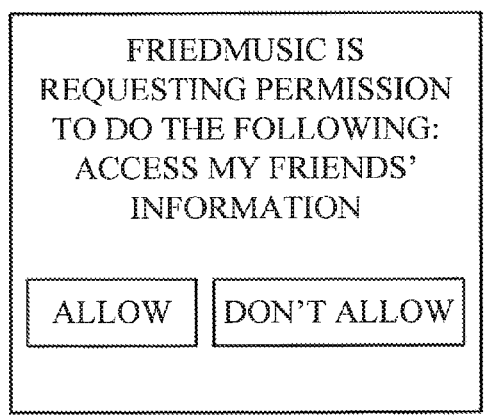
FIGS. 5B and 6B illustrate dialog boxes related to embodiments of this disclosure.

FIG. 5B illustrates an example of such a dialog box, in which the user can choose whether to authorize access or not, by selecting an "Allow" button or a "Don't allow" button, respectively. If the user selects the "Allow" button, the user authorizes access to his or her resource by the client 506.

In S-532 of FIG. 5A the authorization server 2 receives an authorization from the user 502. Based on the receipt of authorization, the authorization server 2 504 generates S-534 an authorization code. The authorization server 2 504 then redirects S-536, S-538 the user agent 503 to the client's redirect URL. This user agent redirection may be implemented by invoking of a web browser accessing the client's redirect URL.

After the authorization code has been generated by the authorization server 2 504, a signature as comprised in the authorization code is sent via GBA to the authorization server 1 510 that implements the GBA NAF. The usage of this signature will be described further down.

Down below, the authorization code will be described in more detail, after which the signaling-type diagram will be returned to.

The authorization code is a string concatenating at least the client's name, the client's identity, the scope of the access, a BTID, a nonce, and a signature. All parameters are appropriately encoded to be applicable as URL. For example, the redirection URL including the authorization code, as sent in S-536, S-538 may look like:

https://friendmusic.com/callback?code=FriendMusic,09736251,friends,btid,nonce,signature It may be added that since "btid", "nonce" and "signature" parameters of the authorization code are in reality comprises values, the URL may look like this:

https://friendmusic.com/callback?code=FriendMusic, 09736251,friends, V4bvlhjNaWj56Ws0KJya7A==@bsf.labs.ericsson.net, 6629fae49393a0, 5ccc069c403ebaf9f0171e9517f30e410539745097 wherein "V4bvlhjNaWj56Ws0KJya7A==@bsf.labs.ericsson.net" is the BTID, "6629fae49393a0" is the nonce, and "5ccc069c403ebaf9f0171e9517f30e410539745097" is the signature.

It is further noted that the signature is a Message Authentication Code (MAC) that is signed by a Network Application Function (NAF) key over a concatenated string including the client's name as client_name, the client identity as client_id, the scope, the BTID and the nonce.

In order to prevent a malicious client to cheat the user by presenting a faked client_name and the scope, to impersonate a trusted client, the signature comprises the above mentioned parameters.

A NAF ID that is used to derive the NAF key, that is used for the generation of the signature, is pre-known by the authorization server 2 504. The signature form looks like this:

signature=HMAC-SHA1(KsNAF, concat(client_name, client_id, scope, BTID, nonce))

For comparison it may be added that an authorization code generated by an OAuth authorization server according to prior art is a pseudo random string.

In the present disclosure, the authorization code comprises several parameters which enables the token endpoint as comprised in the authorization server 1 510 to self-verify the authorization code. This will be described down below.

Now, returning to the signaling-type diagram of FIG. 5A, the user agent 503 sends S-538 a HTTP GET command according to the client's redirection URL to the client 506.

The client then sends S-540 over a HTTPS (HTTP Secure) connection a request for an access token, to the token endpoint of the authorization server 1 510. The request may look like this:

POST/token HTTP/1.1
Host: oauth.example.com
Content-Type: application/x-www-form-urlencoded
grant_type=authorization_code&client_id=09736251&client_secret=gX1fBat3bV&code=FriendMusic,09736251,friends,btid,nonce,signature&redirect_uri=https://friendmusic.com/callback In S-542 the authorization server 1 510 communicates with the GBA BSF 508, and retrieves the NAF key for the specified BTID session over Zn interface.

Based on the received parameters the authorization server 1 510 now calculates a signature on its own by signing a concatenation of the relevant set of parameters by a NAF key. The authorization server 1 510 then compares the signature as received from the client in S-540, with the internally calculated signature.

If the two MAC signatures are the same, the authorization server 1 510 verifies the MAC signature in the authorization code. The authorization server 1 510 also verifies that a client secret and the client_name match the client secret and the client_name as registered during the client registration S-520. If the MAC signatures are the same and the client secret as well as the client_name match, the authorization server 1 510 verifies S-544 the authorization code. Upon verifying the authorization code, the authorization server 1 510 issues S-546 an access token for accessing a resource in the resource server 512. The authorization server 1 510 returns S-548 the access token to the client 506, after which the client 506 starts accessing resources in the resource server 512 by presenting S-550 the access token to said resource server.

It should be mentioned that the user 502 is automatically authenticated by means of GBA by the sending of the signature by the authorization server 2 504 to the authorization server 1 510, implementing GBA NAF. The client 506 of the web site therefore considers that the user 502 is authenticated to the authorization server 1 510 via GBA if the OAuth authorization code flow of FIG. 5A is successfully accomplished.

However, the web site may wish to perform its own authentication of the user 502 by using means different from GBA, such as username and password that the user has registered in the web site. In order to use such an authentication of the user, an additional step is required in which the user performs a web site-specific authentication.

Also, users who wish to be anonymous to the web site due to a privacy concern may select "Don't allow" in the interrogation, as schematically illustrated in FIG. 5B. In this case, GBA authentication is omitted, for which the authorization server 1 510 will not be able to authenticate the user. No identity information of the user will be sent to the web site. The authorization server 1 510 simply informs the web site that the user did not allow access to his or her resource.

However, GBA authentication may be performed even though the user selects "Don't allow". In this case, the user agent 503 sends a signature to the authorization server 1 510, after which the authorization server 1 may authenticate the user by GBA. The authorization server 1 510 may choose either to send or not to send the user's identity information to the web site client 506, together with the fact that the user did not allow. Rephrased, anonymity towards the web site client 506 may be kept if it is desired, even though the user is authenticated by GBA.

In the above described embodiments of the present disclosure above, in relation to FIG. 5A, the user agent 503 is located with the mobile phone 505, being one example of a portable communication device.

Down below will be presented embodiments for which a user agent is located in a device such as a tablet or TV, being a device different from the mobile phone.

An example of such a use case is the following. A user enjoys an Internet service such as an online shopping service by using a tablet device. When choosing how to pay, the user chooses to pay via his charging account at his mobile operator. If the mobile phone and the tablet device both supports Near Field Communication (NFC), the user is requested to touch or position his mobile phone onto the tablet, by which the user authorizes the client, here the shopping service, to be paid by the user's mobile charging account.

Figure 6B:
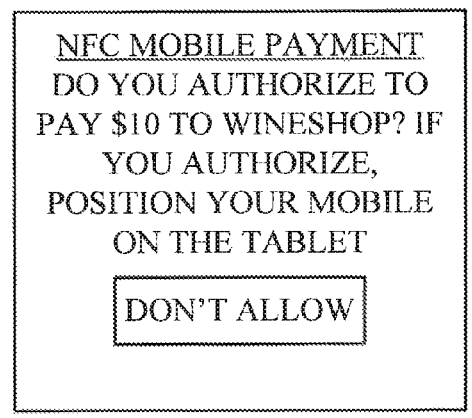
Figure 6A:
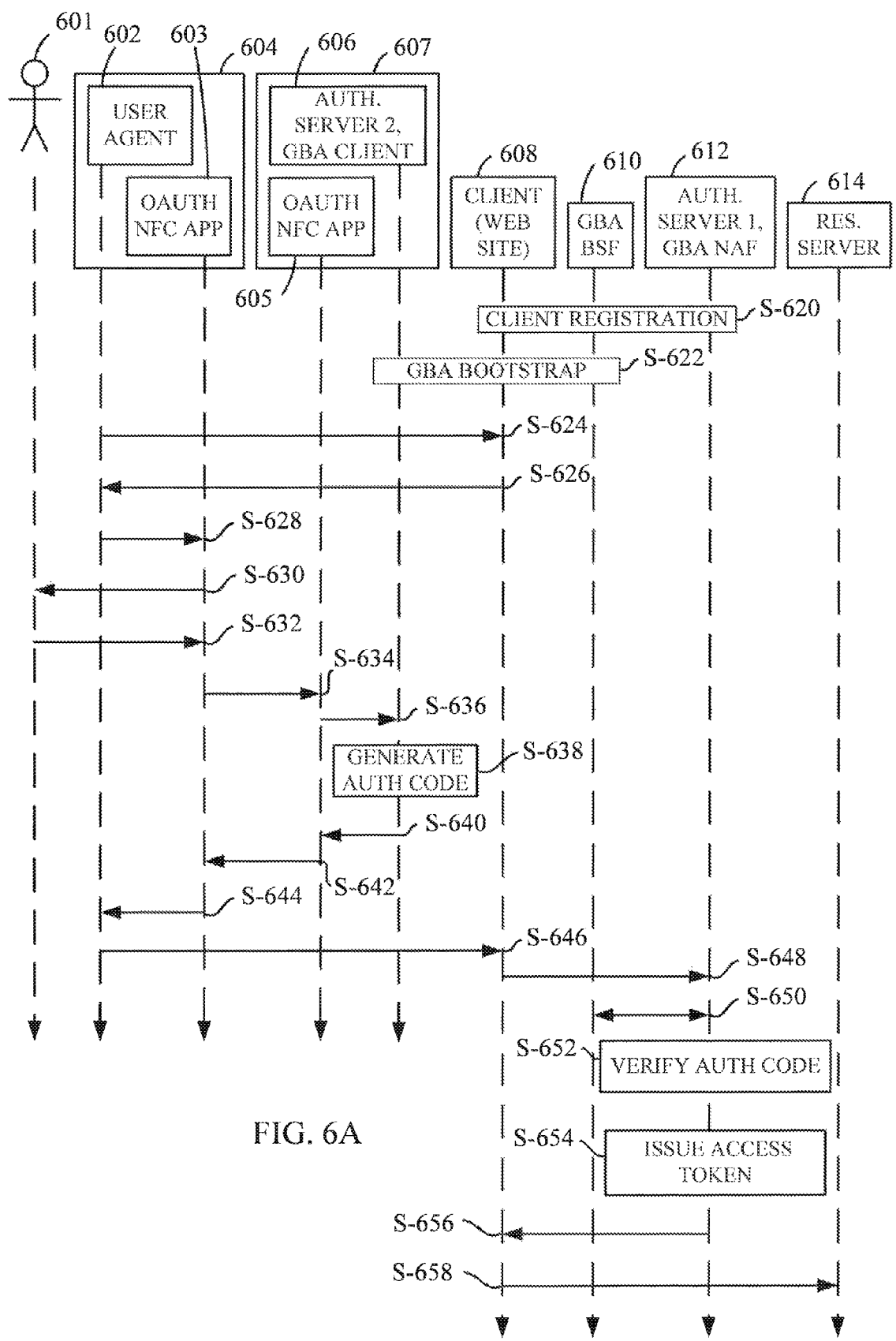

FIG. 6A presents a signaling-type diagram of authorization code flow when applying NFC. FIG. 6A comprises a user 601, a user agent 602 and an OAuth NFC Application 603 of a second device 604. A mobile phone 607 comprises an OAuth NFC Application 605 and an Authorization server 2 606. A client 608, a Generic Bootstrapping Architecture (GBA) Bootstrapping Server Function (BSF) 610, an Authorization server 1, implementing a GBA Network Application Function (NAF), and a resource server 614 are also comprised in FIG. 6A.

The client 608 registers S-620 with the authorization server 1 612, prior to initiating the authorization code flow signaling of FIG. 6A, similar to the client registration S-520 of FIG. 5A. A GBA bootstrap is established between the authorization server 2 606 and the GBA BSF 610, similar to S-522 in FIG. 5A.

Reference is therefore made to FIGS. 5A and S-520 and S-522 for S-620 and S-622, respectively.

Now, the user 601 on the user agent 602 device 604 sends S-624 a request to the web site to access the user's resource, for instance the charging account on the resource server. Moreover, the user 601 chooses to authorize the access by his or her mobile phone 607 by using NFC. The user on the user agent 602 is redirected S-626-S-636 by the client 608 to the authorization server 2 606.

An example of the redirection URL is:
mobilepayment://
?client_name=WineShop&response_type=code&client_id=09736252&scope=$10&redirect_uri=https://wineshop.com/callback This redirection URL uses a custom URL scheme in order to invoke a NFC application to get an authorization code from the authorization server 2 606 located in the mobile phone 607, via NFC.

In S-628 the OAuth NFC Application 603 is invoked by the user agent 602. The NFC application now presents S-630 a confirmation dialog, as presented in FIG. 6B, asking if the user authorizes to pay $10 to an application "Wine shop". The user is requested to position his mobile phone onto the tablet device if he authorizes.

It is noted that OAuth may be used in many different ways for payment authorization. In this example, an amount of money to be authorized is put in the "scope" OAuth parameter. There may be many other ways.

If the user positions S-632 his mobile onto or near the tablet device, the OAuth application 603 of the tablet 604 communicates S-634 with the OAuth NFC application 605 of the mobile phone 607, after which a request for an authorization code is sent S-636 to the authorization server 2 607. It is added that all request parameters that are necessary to generate an authorization code are sent to the authorization server 2 607.

Upon receipt of the request, the authorization server 2 immediately generates S-638 an authorization code, after which it forwards S-640 said authorization code to the OAuth NFC application 605. Via NFC the authorization code is transferred to the OAuth NFC application 603 in the tablet device 604.

The authorization code is a string concatenating at least the name of the client as "client_name", the identity of the client as "the client_id", the scope, a BTID, a nonce, and a signature, wherein all parameters are appropriately encoded. For example, the authorization code looks like:

code=WineShop,09736252,$10,btid,nonce,signature wherein the signature is a MAC signed by a NAF key over a concatenated string including the client_name, the client_id, the scope, the BTID, and the nonce. Hence, signature=HMAC-SHA1(KsNAF, concat(client_name, client_id, scope, BTID, nonce))

Needless to say, the parameters are in reality filled with values, as described above in relation to FIG. 5A.

The OAuth NFC application 603 now invokes S-644 the user agent 602 with the client's redirection URL comprising the authorization code parameters. The redirection URL may look like this:

https://wineshop.com/callback?code=WineShop,09736252,$10,btid,nonce,signature

The user agent 602 is thus directed S-646 to the client 608 according to client's redirect URL.

Since S-648-S-658 are similar to S-540 to S-550 from FIG. 5A, for which reason reference is made to FIG. 5A, mutatis mutandis.

The signaling-type diagram of signaling within an authorization code flow by using NFC has hence been described.

Figure 7:
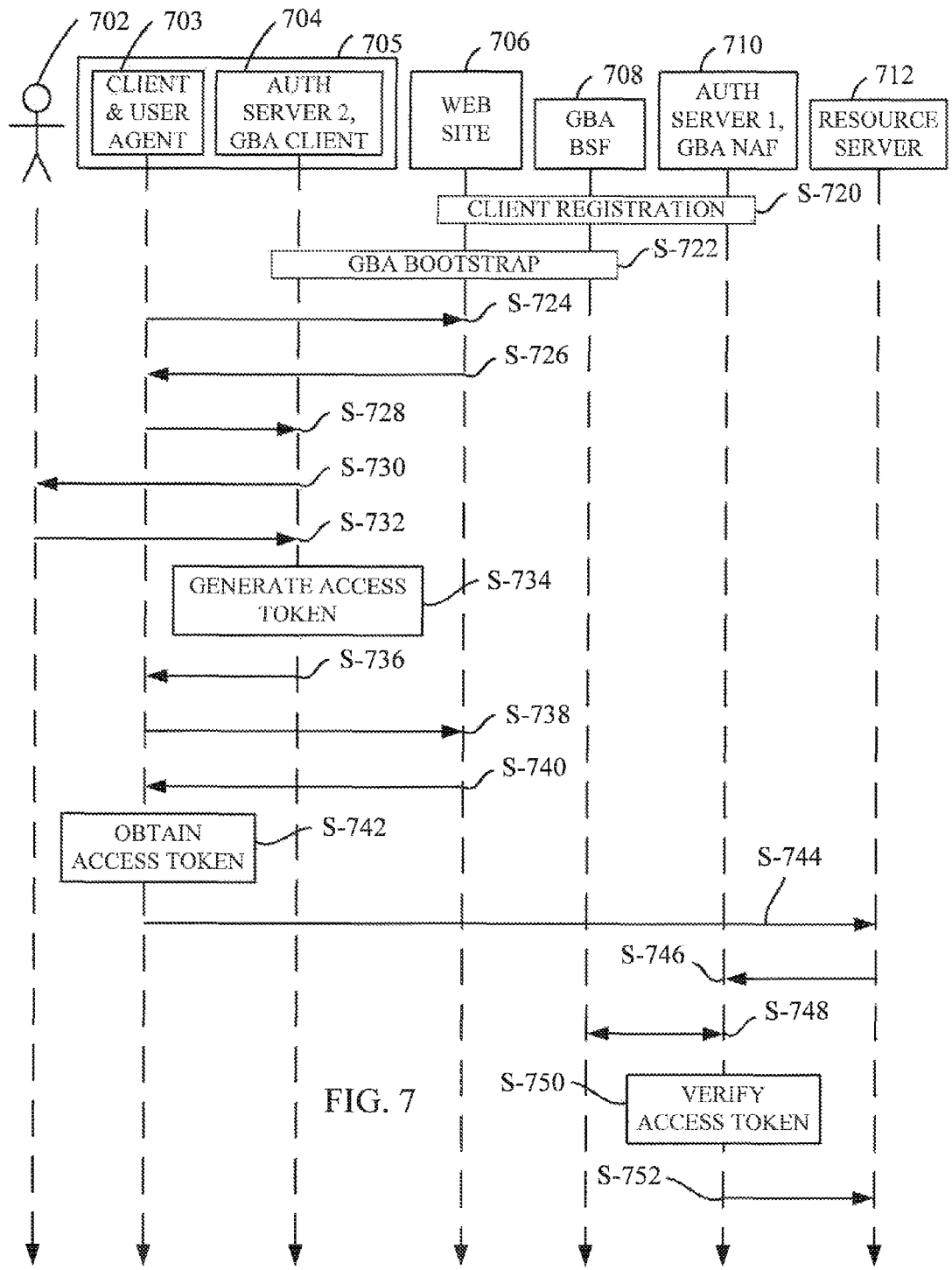

In the following, the implicit grant flow according to some embodiments of the present disclosure will now follow. FIG. 7 illustrates a signaling-type diagram of an implicit grant flow architecture, having a user 702, a user agent 703, an authorization server 2 704, a portable communication device 705, a web site 706, a GBA BSF 708, an authorization server 1 710 implementing a GBA NAF, and a resource server 712.

The implicit grant flow is suitable for clients that are not capable to maintain their client credentials confidential for authenticating with authorization server. Examples of such clients are client applications that reside in a user agent, typically implemented in a browser using a scripting language such as JavaScript and Hyper Text Markup Language. The client must be able to interact with the resource owner's user agent, which typically is a web browser, and receive incoming requests via redirection from an authorization endpoint of an authorization server.

It is added that the client in the mobile phone 705 may thus be a web application that is loaded from the web site 706 when a user 702 visits the web site 706 by his or her mobile phone user agent 703.

In contrast to the authorization code flow, in which the client makes separate requests for authorization and access token, the client herein receives the access token as a result of the authorization request.

It should be mentioned that implicit grant flow does not comprise client authentication since the client is unable to maintain their credentials confidential. The client resides on the resource owner's device or computer which makes the client credentials accessible and exploitable.

Before explicitly discussing the signaling of the implicit grant flow, the following is mentioned. As for the authorization code flow, as described above, the authorization endpoint function of a general authorization server is moved to a portable communication device such as a mobile phone. The authorization endpoint is hence denoted authorization server 2, and implements a Generic Bootstrapping Architecture (GBA) client.

The client registration function of the general authorization server remains in a network-side authorization server that is denoted authorization server 1 and which implements GBA NAF.

It is again pointed out that the service provider who runs the web site, the client of which is accessing to user resources decides if the authorization code flow or the implicit flow will be used. The service provider registers in the authorization server 1 706 and gets a client_id. If the implicit flow will be used, the client_id is embedded in the JavaScript program mentioned, which is loaded to the mobile phone user agent 703 and run on the user agent browser.

It is noted that there is no token endpoint function required in the authorization server 1 since the authorization endpoint directly issues access tokens in the implicit grant flow.

The client redirects a user agent to the authorization server 2 for example by using a custom scheme URL or by using a normal HTTP scheme.

Similar to above, the access token that is generated by the authorization server 2 comprises at least the name of the client, in client name, the identity of the client; in client id, scope, a nonce, the client's redirect URL, and a signature that is signed by a NAF key.

The resource server herein requests verification of the access token to the authorization server 1 that verifies the access token by the NAF key, and allows access to the resource if the access token is verified.

Now the signaling in FIG. 7 will be described in more detail.

Since the signaling of S-720-S-732 is the same or similar as the signaling of S-520-S-532 as presented in FIG. 5A, reference is made to FIG. 5A and the accompanying text passages above.

So, having received a user authorization by the authorization server 2 in S-732, the authorization server 2 704 generates S-734 an access token and redirects S-736 the user agent 703 to the redirect URL as specified by a redirect_uri. This user agent redirection may be invocation of a web browser with the redirect URL.

Similar to above, the access token is a string concatenating at least the client_name, the client_id, the scope, a BTID, a nonce, the client's redirect_uri and a signature, where all parameters are appropriately encoded for URL. For example, the redirection URL that comprising the access token may look like this:

https://friendmusic.com/
callback#access_token=FriendMusic,09736251,friends,
btid,nonce,https://friendmusic.com/callback,
signature&token_type=bearer where the signature is a Message Authentication Code (MAC) that is signed by a NAF key over a concatenated string including the client_name, the client_id, the scope, the BTID, the nonce and the redirect_uri. Hence, signature=HMAC-SHA1(KsNAF, concat(client_name, client_id, scope, BTID, nonce, redirect_uri))

It is noted that btid, nonce, and signature parameters in the redirection URL above are actually filled with actual values, for instance, as mentioned above in relation to S-536 of FIG. 5A.

The user agent 703 thus sends S-738 a HTTP GET command according to the redirection URL to the web site 706.

It should be mentioned that the access token itself is not sent to the web site for the reason that the access token is a Uniform Resource Identifier fragment. The user agent thus retains the fragment.

In S-740 the web site 706 returns a script web page by which the client 703 is capable of accessing the fragment. In S-742 the client 703 extracts the access token from the fragment. Having obtained the access token, the client sends S-744 a request for accessing a resource to the resource server 712 and presents the access token. In S-746 the resource server 712 sends S-746 a request for verification of the access token to the authorization server 1 710. The authorization server 1 710 interacts with the GBA Bootstrapping Server Function (BSF) 708, and retrieves a NAF key for the specified Bootstrapping Transaction Identity (BTID) over a Zn interface.

The authorization server 1 710, now calculates a Message Authentication Code (MAC) signature based on the parameter values as obtained in the access token. The authorization server 1 710 then compares the internally calculated MAC signature with the MAC signature as received. The authorization server 1 710 also compares the client_name and the client_id as received with the ones from the client registration S-720. If the MAC signatures are the same and the client_name and client_id match, the authorization server 1 verifies S-750 the access token. The authorization server 1 710 then sends S-752 a positive verification response, if the access token in fact is verified, to the resource server 712 and allows access to the resource according to the request a sent in S-744.

In the following flow-charts of methods related to the present disclosure will be presented.

Figure 8:
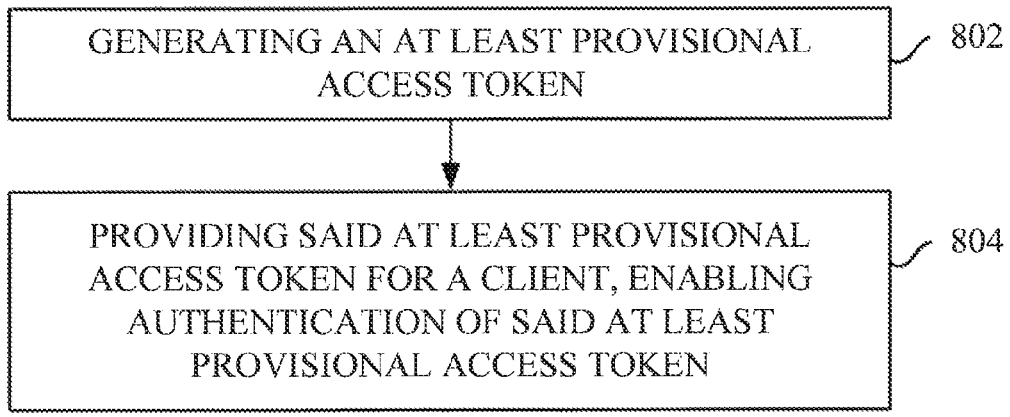

FIG. 8 presents a flow-chart of an exemplary method in a portable communication device 505, 607, 705, 1402 for authorizing a client 506, 608, 703 to access a resource in a network. The portable communication device is associated with an authorization server 510, 612, 710 for the network via an authentication function 508, 610, 708 that has shared an authentication key with the portable communication device. This authentication key may be a master secret key.

The method comprises generating S-534, S-638, S-734, 802, 1014, 1114 an at least provisional access token to be used by said client for accessing said resource in the network, based on said shared NAF authentication key. The method also comprises providing S-538, S-642, S-736, 804 said at least provisional access token for the client enabling authentication of said at least provisional access token by the authorization server 510, 612, 710 for the network.

Figure 9:
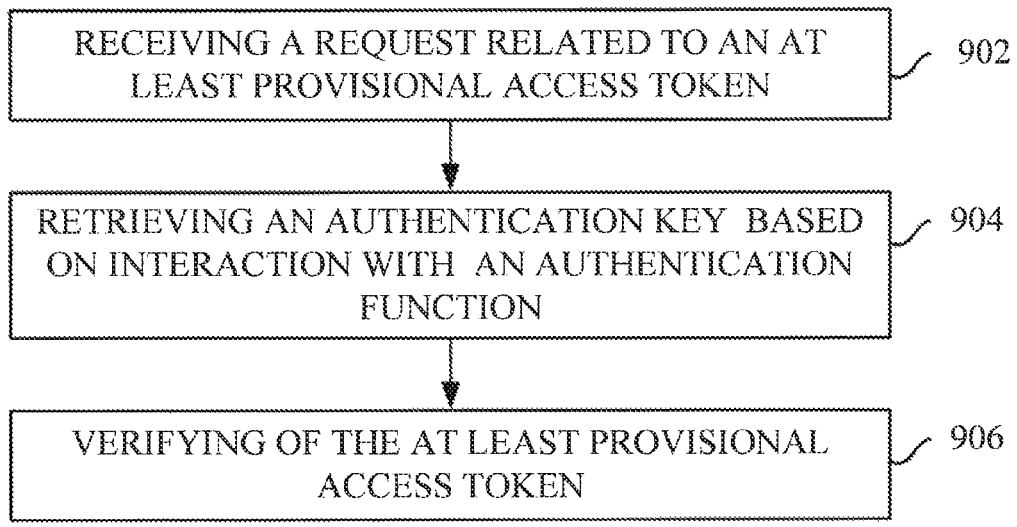

FIG. 9 presents a flow-chart of an exemplary method in an authorization server 510, 612, 710, 1502 for authenticating access to a resource in a network for a client. The authorization server has shared a client identifier with said client 506, 608, 703 and is associated with an authentication processor 504, 606, 704 of a portable communication device 505, 607, 705 via an authentication function 508, 610, 708. The method comprises receiving S-540, S-648, S-746, 902, 1202, 1302 a request related to an at least provisional access token, and retrieving S-542, S-650, S-748, 904, 1204, 1304 an authentication key based on interaction with the authentication function 508, 610, 708. This authentication key is a NAF key that is retrieved from the shared master secret key. In addition, the method also comprises verifying S-544, S-652, S-750, 906, 1206, 1306 of the at least provisional access token, by which the access to the resource 512, 614, 712 is authenticated.

Figure 10:
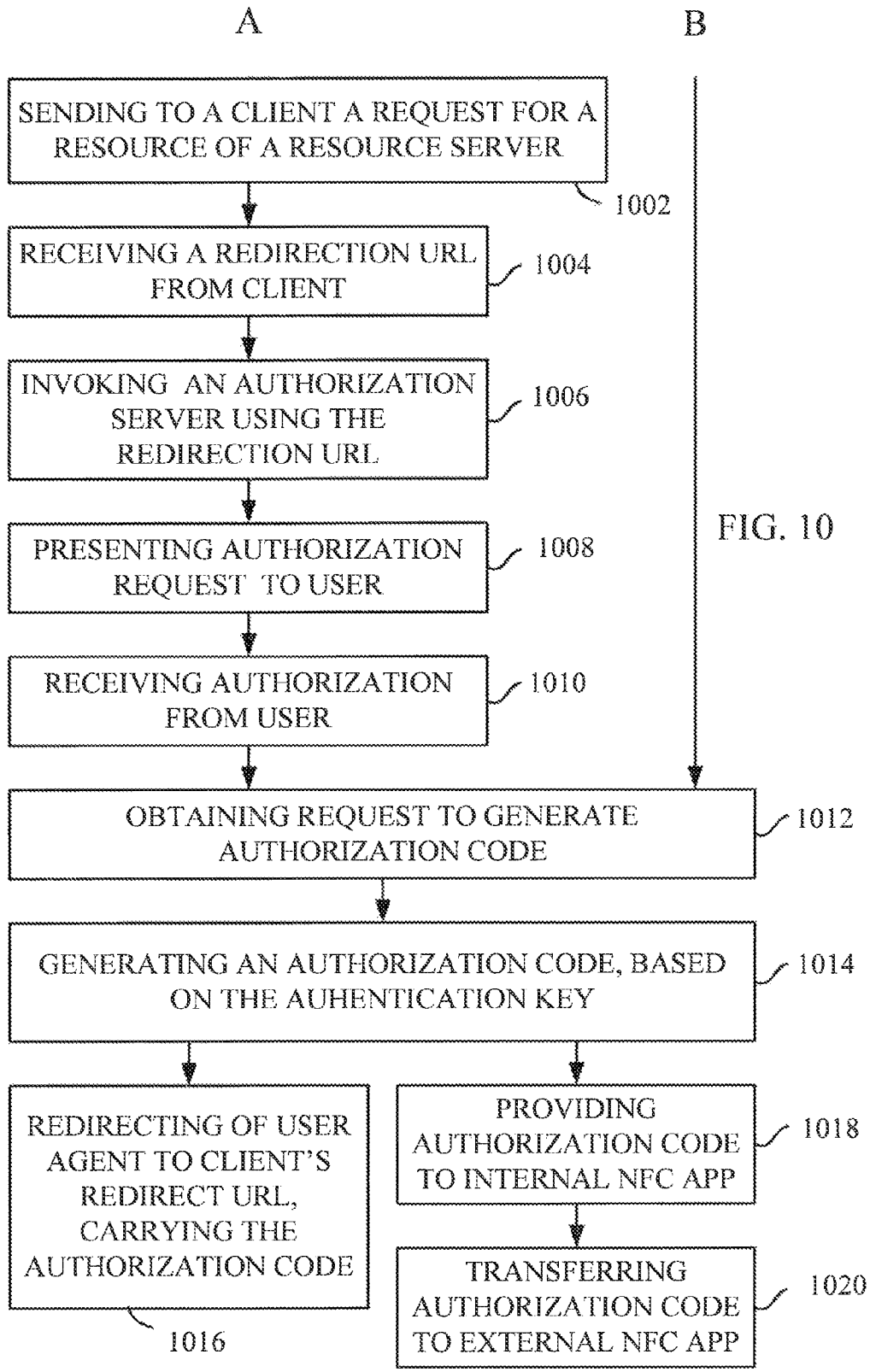

FIG. 10 presents two flow-charts of methods in a mobile phone using the authorization code flow. The left-hand one "A" is applicable for an architecture as presented in FIG. 5A, whereas the right-hand one "B" is applicable for an architecture as presented in FIG. 6A, i.e. when using Near Field Communication (NFC).

Prior to initiating the method, a GBA bootstrap is established between the mobile phone 505 and a GBA BSF 508. In addition, a client registration of the client 506 of a web site in an authorization server 1, implementing a GAB NAF, is also performed. The mobile phone 505 is also associated with the authorization server 1 510 via the GBA BSF 508. An authentication key is shared between the GBA BSF 508 and the authorization server 2 of the mobile phone 505. This authentication key is a master secret key. Based on this master secret key an authentication key in the form of a NAF key may be obtained.

According to one embodiment of the present disclosure, the "A" flow comprises sending 1002 to a client 506 a request for a resource of a resource server 512. The mobile phone 505 then receives 1004 a redirection Uniform Resource Location (URL) from the client 506. The mobile phone 505 invokes 1006 an authorization server 504 using the redirection URL. The mobile phone 505 then presents 1008 an authorization request to the user 502. As a response to the request, an authorization is received 1010 by the mobile phone 505 from the user 502. The mobile phone 505 may thus be considered to obtain 1012 a request to generate an authorization code. The mobile phone 505 hence generates 1014 the authorization code, based on the NAF authentication key. Then, the user agent 503 of mobile phone 550 is redirected 1016 to the client's redirect URL, carrying the authorization code. Thereafter, events and steps are taken outside of the mobile phone 505.

According to another embodiment of the present disclosure, the "B" flow comprises 1012 and 1014 of the "A" flow. The "B" represents a flow in which a mobile phone 607 communicates with another portable communication device 604 such as a tablet device by using NFC. Having generated the authorization code by the mobile phone 607, the authorization code is provided 1016 to an OAuth NFC application, within the mobile phone 607. The authorization code is transferred 1020 to an OAuth NFC application 603 outside of the mobile phone.

Figure 11:
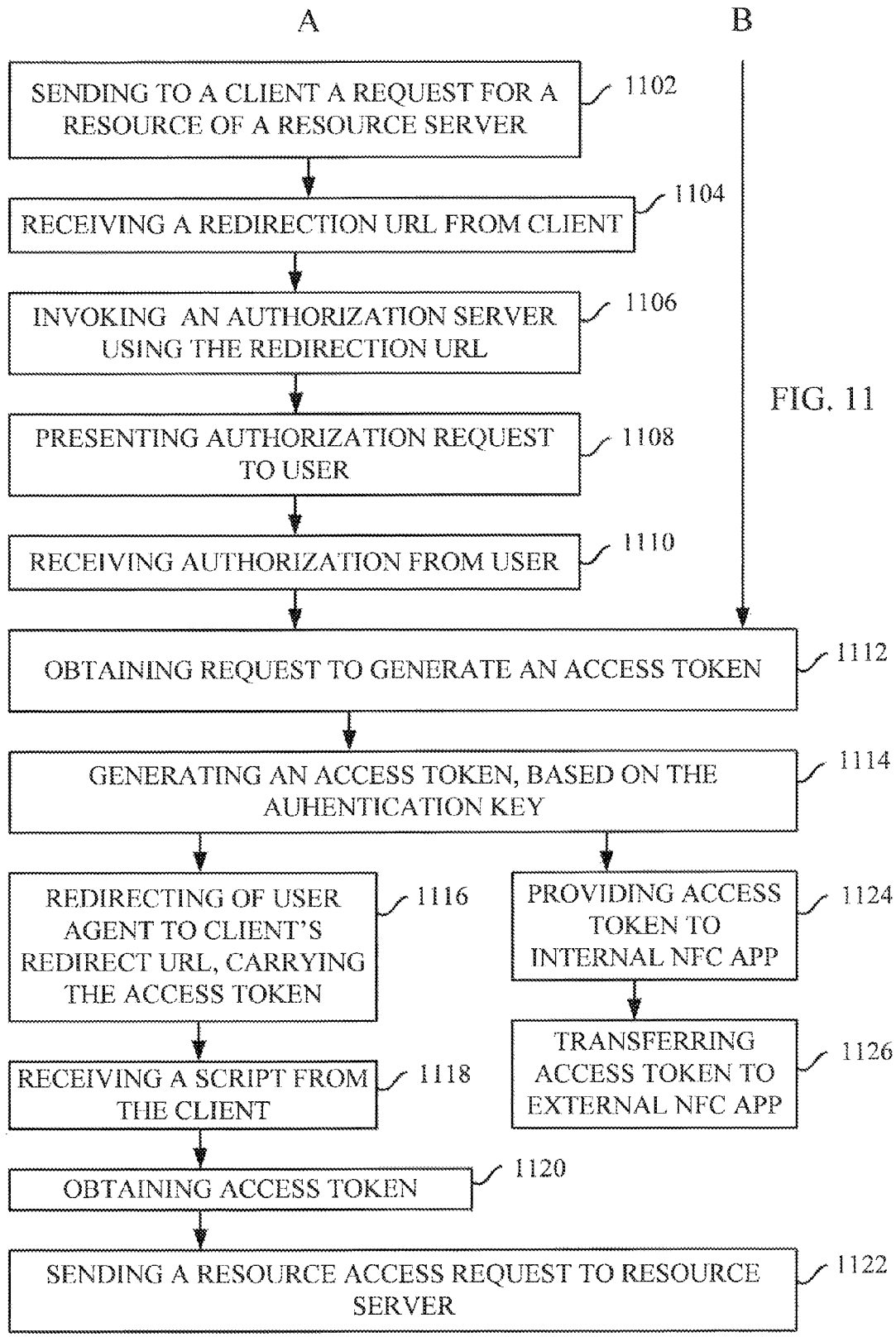

FIG. 11 presents two flow-charts of methods in a mobile phone using the implicit grant flow. The left-hand one "A" is applicable for an architecture as explicitly presented in FIG. 7, whereas the right-hand one "B" is applicable for an architecture in which Near Field Communication (NFC) is being used.

Prior to initiating the method, a GBA bootstrap is established between the mobile phone 705 and a GBA BSF 708. In addition, a client registration of the client 706 of a web site in an authorization server 1, implementing a GAB NAF, is also performed. The mobile phone 705 is also associated with the authorization server 1 710 via the GBA BSF 708. An authentication key is shared between the GBA BSF 708 and the authorization server 2 of the mobile phone 705. This authentication key is a master secret key. Based on this master secret key an authentication key in the form of a NAF key may be obtained.

According to one embodiment of the present disclosure, the "A" flow comprises 1102-1110 which all are the same or at least similar to 1002-1010, for which reason reference is being made to FIG. 10 and said 1002-1010 for 1102-1110 of FIG. 11. The mobile phone 705 may thus now be considered to obtain 1112 a request to generate an access token. The mobile phone 705 generates 1114 an access token, based on the NAF authentication key as earlier was shared. In 1116 the mobile phone 705 redirects the user agent to the client's redirect URL, carrying a fragment for the access token. Thereafter, the mobile phone 705 receives 1118 a script from the web site 706. Based on the script, the mobile phone 705 obtains 1120 the access token from a fragment for the access token. Having access to the access token, the mobile phone 705 sends 1122 a resource access request to the resource server 712.

According to another embodiment of the present disclosure, the "B" flow comprises 1112 and 1114 of the "A" flow. The "B" represents a flow in which a mobile phone communicates with another portable communication device such as a tablet device by using NFC. Having generated the authorization code by the mobile phone, the access token is provided 1124 to an OAuth NFC application within the mobile phone. The access token is then transferred 1126 to an OAuth NFC application of the tablet device outside of the mobile phone.

Figure 13:
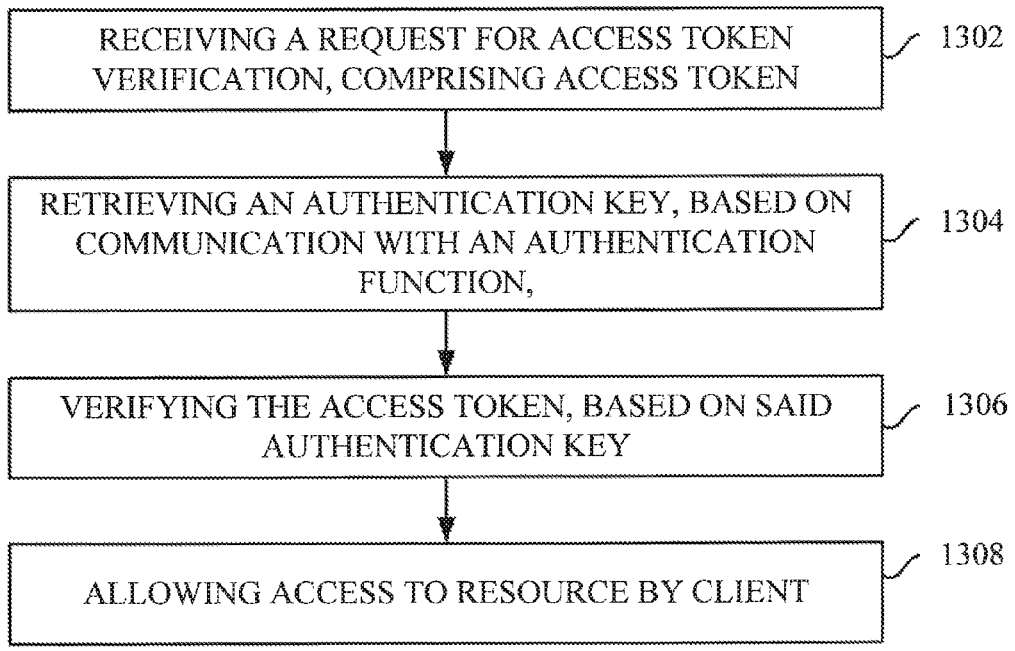
FIGS. 8-13 present flow-charts of methods related to embodiments of this disclosure.
Figure 12:
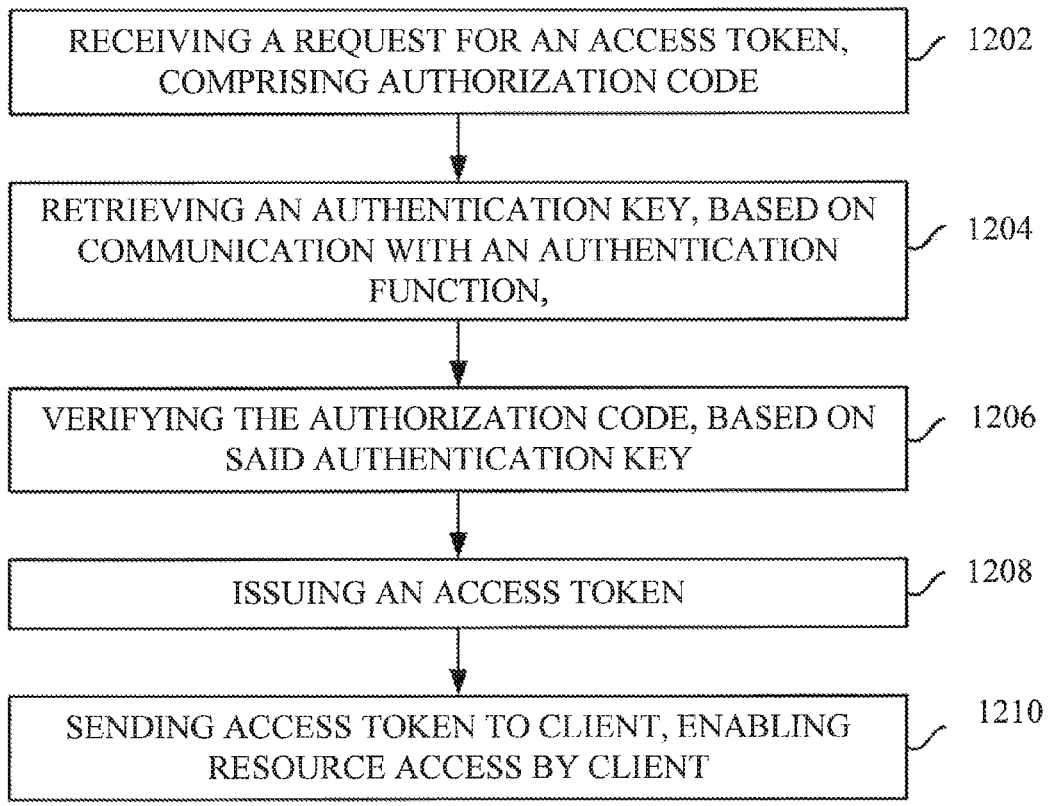

In the following two flow charts of embodiments of the present disclosure, illustrate methods in a network-side authorization server 1. FIG. 12 presents a flow chart for an authorization code flow, whereas FIG. 13 presents a flow chart for an implicit grant flow.

It can be added that the architecture of FIG. 5A is applicable to the flow chart of FIG. 12. Prior to initiating the flow chart it should be mentioned that a client registration is established. In addition, a GBA Bootstrap between an authentication server located in a portable communication device and a GBA BSF has also been performed. Via the client registration the authorization server 510 has shared a client identifier with said client 506.

With reference to FIG. 12, the flow chart comprises receiving 1202 a request for an access token, comprising an authorization code. This corresponds to S-540 of FIG. 5A.

The authorization server 510 then retrieves 1204 an authentication key NAF, based on communication or interaction with an authentication function 508, which may be a GBA BSF.

The authorization server then verifies 1206 the authorization code, based on an authentication key as exchanged between an authorization server 504 of the mobile phone 505 and the GBA BSF 508.

The retrieval of the authentication NAF key is based on the shared master secret key, available to the authorization server 1 via the GBA BSF 508.

As the authorization server 1 510 has verified the authorization code, an access token is issued 1208 by the authorization sever 1 510. Thereafter, the authorization server 1 510 sends 1210 the access token to the client 506.

Above has been described a method for authenticating access to a resource in a network for a client using authorization code flow, according to an embodiment of the present disclosure.

Below will be described a method for authenticating access to a resource in a network for a client using implicit grant flow, according to an embodiment of the present disclosure.

It can be added that the architecture of FIG. 7 is applicable to this flow chart. Prior to initiating the flow chart it should be mentioned that a client registration is established. In addition, a GBA Bootstrap between an authentication server located in a portable communication device and a GBA BSF has also been performed. Via the client registration the authorization server 710 has shared a client identifier with a client.

With reference to FIG. 13, the flow chart comprises receiving 1302 a request for verification of an access token, where the request comprises the access token. This corresponds to S-746 of FIG. 7. The authorization server 1 then retrieves 1304 an authentication NAF key, based on communication or interacting with an authentication function, read the GBA BSF.

The retrieval of the authentication NAF key is based on the shared master secret key, available to the authorization server 1 via the GBA BSF 508.

Based on said authentication NAF key, the authorization server 1 then verifies 1306 the access token. Having a verified access token access to the resource server by the client is allowed 1308.

Figure 14:
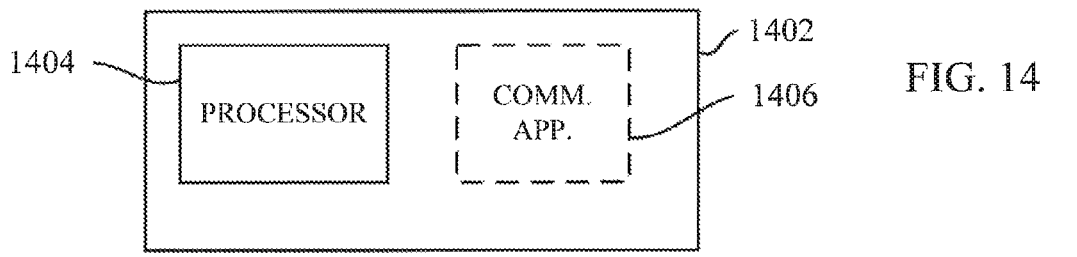
FIGS. 14-15 schematically illustrate arrangements according to some embodiments of this disclosure.

FIG. 14 schematically illustrates a portable communication device 1402 for authorizing a client 506, 608, 703 to access a resource in a network. The portable communication device is associable with an authorization server 510, 612, 710 for the network via an authentication function 508, 610, 708 that has shared an authentication key with the portable communication device 1402. The portable communication device comprises an authentication processor 1404 that is configured to generate S-534, S-638, S-734, 802, 1014, 1114 an at least provisional access token to be used by said client for accessing said resource in the network, based on said authentication key. The authentication processor is further configured to provide S-538, S-642, S-736, 804 said at least provisional access token for the client, enabling authentication of said at least provisional access token by the authorization server 510, 612, 710.

The portable communication device 1402 for authorizing a client 608 may also comprise a short-range wireless communication application 1406 that is configured to receive an authorization from a user of another portable communication device 604, and to send said at least provisional access token by short-range wireless communication NFC to said another portable communication device 604.

Figure 15:
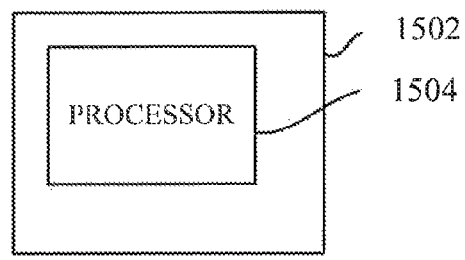

FIG. 15 schematically presents an authorization server 1502 for authenticating access to a resource in a network for a client. The authorization server is configured, prior to authenticating access to the resource, to have shared a client identifier with said client and to be associated with an authentication processor of a portable communication 505, 607, 705 device via an authentication function 508, 610, 708. The authorization server comprises a processor 1504 that is configured to receive S-540, S-648, S-746, 902, 1202, 1302 a request related to an at least provisional access token, and to retrieve S-542, S-650, S-748, 904, 1204, 1304 an authentication key based on interaction with an authentication function 508, 610, 708 in the network. The processor 1502 is further configured to verify S-544, S-652, S-750, 906, 1206, 1306 the at least provisional access token, by which the access to said resource 512, 614, 712 in the network is authenticated.

Embodiments of this disclosure have the following advantages:

The present disclosure saves over-the-air communication and several round trip communications between mobile devices and network-side OAuth authorization servers. This enables faster completion of the OAuth authorization as compared to methods known today.

The present disclosure also enables a split device scenario where the user is using a device such as TV and tablet that is different from the mobile phone for enjoying Internet services, when she/he wants to use her/his mobile phone as a key device for granting authorization by just positioning or touching the mobile phone to the other device. The present disclosure fits into the user experience very well because mobile phone works just as the authorization server that does not need to communicate with network-side for getting an authorization code or an access token.

It must be emphasized that this disclosure may be varied in many ways.

The elements of an embodiment of this disclosure may be physically, functionally and logically implemented in any suitable way. Indeed, the functionality may be implemented in a single unit, in a plurality of units or as part of other functional units. As such, this disclosure may be implemented in a single unit, or may be physically and functionally distributed between different units and processors.

It should be noted that the above-described portable communication device and authorization server could be implemented by physical or logical entities using software functioning in conjunction with a programmed microprocessor or general purpose computer, and/or using an application specific integrated circuit.

They may further comprise additional internal and external storage devices, as well as appropriate communication interfaces, including hardware and software capable of performing the necessary modulating, coding, filtering and the like, as well as demodulating and decoding to process such signals.

Moreover, even though the embodiments of this disclosure are primarily described in the form of methods and devices, they may at least partly be embodied in a computer program product, as well as in a system comprising a computer processor and a memory coupled to the computer processor, wherein the memory is encoded with one or more computer programs for performing at least a part of the methods described herein.

It is made clear that presented embodiments may well be combined forming new embodiments not explicitly described herein.

In the claims, the term "comprises/comprising" does not exclude the presence of other elements or steps. Additionally, although individual features may be included in separate claims, these may be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

Although this disclosure has been described above with reference to (a) specific embodiment(s), it is not intended to be limited to the specific form set forth herein. Rather, this disclosure is limited only by the accompanying claims and, other embodiments than the specific above are equally possible within the scope of these appended claims.

The invention claimed is:

1. A method in a portable communication device for authorizing a client to access a resource in a network, wherein the portable communication device is associated with an authorization server for the network via an authentication function that has shared an authentication key with the portable communication device, the method comprising:
receiving a redirection Uniform Resource Location (URL);
responsive to receiving said redirection URL, presenting to a user of the portable communication device a request requesting authorization of the client to access the resource;
receiving authorization from the user to authorize the client to access the resource;
responsive to receipt of said authorization from the user, generating, by the portable communication device and based on said shared authentication key, an at least provisional access token to be used by said client for accessing said resource in the network, and
providing said at least provisional access token for the client, to enable said at least provisional access token to be authenticated by the authorization server for authenticating access by the client to said resource.

2. The method according to claim 1, wherein the at least provisional access token comprises an authorization code that the client is to present to the authorization server in exchange for an access token with which the client is to access the resource.

3. The method according to claim 1, wherein the at least provisional access token comprises an access token that the client is to present to a resource server associated with the resource for access to the resource.

4. The method according to claim 1, further comprising receiving from another portable communication device, via short-range wireless communication, an authorization from a user of that device to authorize the client to access the resource.

5. The method according to claim 4, further comprises sending the at least provisional access token to said another portable communication device, via short-range wireless communication.

6. The method according to claim 4, wherein the short-range wireless communication comprises Near Field Communication.

7. The method of claim 1, wherein the authentication function is a Generic Bootstrapping Architecture (GBA) Bootstrapping Server Function.

8. A portable communication device for authorizing a client to access a resource in a network, wherein the portable communication device is associable with an authorization server for the network via an authentication function that has shared an authentication key with the portable communication device, wherein the portable communication device comprises an authentication processor that is configured to:
  receive a redirection Uniform Resource Location (URL);
  responsive to receiving said redirection URL, present to a user of the portable communication device a request requesting authorization of the client to access the resource;
  receive authorization from the user to authorize the client to access the resource;
  responsive to receipt of said authorization from the user, generate, based on said authentication key, an at least provisional access token to be used by said client for accessing said resource in the network, and
  provide said at least provisional access token for the client, to enable said at least provisional access token to be authenticated by the authorization server for authenticating access by the client to said resource.

9. The portable communication device according to claim 8, further comprises a short-range wireless communication interface configured to:
  receive from another portable communication device, via short-range wireless communication, an authorization from a user of that device to authorize the client to access the resource, and
  send the at least provisional access token to said another portable communication device, via short-range wireless communication.

10. The portable communication device according to claim 8, wherein the authentication processor comprises a Generic Bootstrapping Architecture (GBA) client that is configured to establish a GBA Bootstrap with the authentication function comprising a GBA Bootstrapping Server Function.

11. The portable communication device according to claim 8, wherein said portable communication device is mobile phone.

12. A method in an authorization server for authenticating access to a resource in a network for a client, wherein the authorization server is configured to share a client identifier with said client and is associated with an authentication processor of a portable communication device via an authentication function, the method comprising:
  receiving, by the authorization server, a request related to an at least provisional access token generated by the portable communication device responsive to the device receiving a redirection Uniform Resource Location (URL) and authorization from a user of the portable communication device authorizing the client to access the resource,
  retrieving, by the authorization server, an authentication key based on interaction with the authentication function, and
  verifying, by the authorization server, the at least provisional access token, to authenticate access to the resource by the client.

13. The method according to claim 12, wherein verifying the at least provisional access token comprises determining an authentication signature based on the retrieved authentication key, and verifying that said determined authentication signature and an authentication signature comprised in the at least provisional access token are equal.

14. The method according to claim 12, wherein the at least provisional access token comprises an authorization code, and wherein the method further comprises issuing, based on verifying the authorization code, an access token that the client is to present to a resource server associated with the resource for access to the resource.

15. The method according to claim 12, wherein the at least provisional access token comprises an access token that the client is to present to a resource server associated with the resource for access to the resource, and wherein receiving a request related to an at least provisional access token comprises receiving a request to verify the access token.

16. An authorization server for authenticating access to a resource in a network for a client, wherein
  the authorization server is configured to, prior to authenticating access to the resource, share a client identifier with said client and is associated with an authentication processor of a portable communication device via an authentication function, wherein the authorization server comprises a processor configured to:
  receive a request related to an at least provisional access token generated by the portable communication device responsive to the device receiving a redirection Uniform Resource Location (URL) and authorization from a user of the portable communication device authorizing the client to access the resource,
  retrieve an authentication key based on interaction with the authentication function, and
  verify the at least provisional access token, to authenticate access to the resource by the client.

17. The authorization server according to claim 16, wherein the processor is further configured to determine an authentication signature based on the retrieved authentication key, and to verify that said determined authentication signature and an authentication signature comprised in the at least provisional access token are equal.

18. The authorization server according to claim 16, wherein the at least provisional access token comprises an authorization code and wherein the processor is further configured to issue, based on verifying the authorization code, an access token that the client is to present to a resource server associated with the resource for access to the resource.

19. The authorization server according to claim 16, wherein the at least provisional access token comprises an access token that the client is to present to a resource server associated with the resource for access to the resource, and wherein the request related to an at least provisional access token comprises a request to verify the access token.

20. The authorization server according to claim 16, wherein the processor embeds a Generic Bootstrapping Architecture network application function.

* * * * *